Patented Oct. 28, 1941

2,260,677

UNITED STATES PATENT OFFICE 2,260,677

PROCESS FOR DETERMINING THE ALKALOID CONTENT OF UNCURED TOBACCO

Louis N. Markwood, Washington, D. C., assignor to Claude R. Wickard as Secretary of Agriculture of the United States of America, and to his successors in office No Drawing. Application October 22, 1940, Serial No. 362,242

7 Claims. (Cl. 260—291)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a process for determining the alkaloid content of uncured tobacco, especially of green or fresh tobacco leaves. Normally, this alkaloid content is substantially pure nicotine. In the breeding of tobacco it is necessary for each plant to be analyzed to determine which plants are desired for further attention. An object of this invention is to enable tobacco growers and breeders to ascertain the alkaloid content of tobacco plants while they are still living in the soil. Heretofore, it was customary in tobacco breeding experiments for the breeder to harvest all of the plants at maturity. This harvesting included a separate collection of the seed of each plant. After harvesting, the leaves were dried or cured and then ground for analysis. This procedure requires a considerable expenditure of time and the use of a great deal of storage space, both for the dried leaves and for the seeds.

The process herein described enables a breeder to obviate the preparation and storage of materials as described above. By the use of this process the breeder can make a selection of desirable plants for further propagation while the plants are still in the soil, and he need harvest only those plants whose alkaloid content, whether it be high or low, interests him.

This process is an exact process in that it gives an absolute value to the alkaloid content of each plant tested so that plants of different types or strains may be unequivocally compared with one another with regard to alkaloid content.

It is to be understood that this process is adaptable not only to the usual commercial types of tobacco represented by *Nicotiana tabacum*, of which nicotine is the principal alkaloid, but to the other species of Nicotiana generally.

Distinctive features of the process are that it is short, accurate, and that only a small sample portion of the tobacco leaf is required for the test, which reduces considerably the time and quantity of materials involved. The size of the sample depends partly on the alkaloid content and partly on the thickness of the leaf, but I have found that a sample about the size of a disk 20 mm. in diameter is generally sufficient. Other advantages of this process will be apparent in the description hereinafter contained.

In accordance with this invention, a small sample is taken from a leaf preserved in essentially a living condition, and the sample is placed in a small vessel. On this sample is placed a small quantity of a solution of sulfuric acid. The strength of the acid should be such as to cause a ready disintegration or digestion of the leaf structure, and it may vary from a mixture of about one part of concentrated sulfuric acid to one part of water, to pure concentrated sulfuric acid, which commercially contains about 95% $H_2SO_4$. A mixture of 9 parts concentrated sulfuric acid to one part water, by volume, is preferred. The quantity of acid used depends upon the quantity of the sample and is of such amount as will cover the area of the sample completely. Using a circular leaf area about 20 mm. in diameter, I have found that six drops of the acid in the preferred concentration is sufficient. The sample is then allowed to remain in contact with the acid a few minutes and then tamped with a blunt rod or similar instrument. The leaf tissue soon disintegrates and becomes a formless pulp. Water is then added to a convenient dilution. To this extract a suitable protein precipitant is added. For this purpose I prefer to use lead oxide, also known as litharge. For 6 drops of 9 to 1 sulfuric acid solution about one gram of litharge is the proper amount. A sufficient amount of the oxide is added so that on agitation all the protein in the extract is precipitated. This amount will normally neutralize the acid and cause the resulting solution to become slightly alkaline. It is desirable to have the solution slightly alkaline because in the subsequent recovery of the mother liquor, if the separation is accomplished by filtering through filter paper, some of the alkaloid will be adsorbed by the filter paper, unless the solution is either alkaline or at least neutral.

When the point of complete precipitation has been reached, which is recognized by the ready settling of the precipitate and clarification of the supernatant liquid, the solution is made to volume, mixed well, and the solid matter, including the precipitate, the undissolved leaf tissue, and excess lead oxide, is separated from the mother liquor by any suitable means, such as filtering through a dry filter paper.

The mother liquor contains all the alkaloid, also a trace of sulfate ion and a small amount of lead ion. The sulfate ion may be ignored. The lead ion may also be ignored, except in cases where it will interfere with the subsequent analysis of the alkaloid, such as where phosphotungstic acid or alcohol is used. To remove these lead ions any suitable method may be employed. The preferred method is to add an element which is more electropositive than lead. A suitable element for this purpose is magnesium. Other elements, such as aluminum, zinc and iron may be used. On agitation with the added element, all of the lead is precipitated. This precipitate is then removed by any suitable means, such as filtration, and the mother liquor recovered, which contains all of the alkaloid in solution, free of protein and lead ions. Any suitable method for estimating tobacco alkaloids in dilute solution may then be applied to the solution obtained.

I have found two methods to be especially suitable for estimating tobacco alkaloids in dilute solutions. One method is a turbidimetric method in which the turbidity produced on adding phosphotungstic acid is measured in a nephelometer or colorimeter. The other method is a colorimetric method involving measurement of the orange or red color produced by the addition of a halogen cyanide, preferably cyanogen bromide, and an amine, preferably B-naphthylamine. In order to obtain an index and to evaluate the readings obtained for the turbidity or color in either of the two methods, a known solution of nicotine is treated in exactly the same way as the test solution and a comparison made between the test solution and the known solution. It is to be understood, however, that other methods for estimating alkaloids may be substituted for either of these two methods.

The process above described gives the alkaloid content per unit leaf area. This information will usually be sufficient. However, should it be desired to determine the alkaloid content on a weight basis, this can be determined readily as follows: When the sample for alkaloid determination is cut from the tobacco leaf, it is accurately weighed, while guarding against loss of moisture. At the same time an additional sample of the tobacco in the same general area is removed and the moisture content of it is determined by any suitable method. A simple method for determining moisture is to weigh the sample first, then dry it to constant weight, the loss of weight representing the moisture content. From his information the dry content of the first, or alkaloid sample, can be calculated and the alkaloid content thereof can be determined on the basis of dry weight.

Having thus described my invention, I claim:

1. The process for obtaining a test solution from tobacco for the purpose of determining the alkaloid content thereof, comprising digesting the tobacco with sulfuric acid, recovering the resulting extracts, reacting lead oxide with said extract in an amount sufficient to precipitate the proteins from the extract and to neutralize the mother liquor, and separating and recovering the mother liquor from the precipitate.

2. The process for obtaining a test solution from tobacco for the purpose of determining the alkaloid content thereof, comprising digesting the tobacco with sulfuric acid, recovering the resulting extract, reacting lead oxide with said extract in an amount sufficient to precipitate the proteins from the extract, separating and recovering the mother liquor from the precipitate, and removing from the liquor any remaining lead ions.

3. The process for obtaining a test solution from tobacco for the purpose of determining the alkaloid content thereof, comprising digesting the tobacco with sulfuric acid, recovering the resulting extract, reacting lead oxide with said extract in an amount sufficient to precipitate the proteins from the extract and to neutralize the mother liquor, separating and recovering the mother liquor from the precipitate, and removing from the liquor any remaining lead ions.

4. The process for obtaining a test solution from tobacco for the purpose of determining the alkaloid content thereof, comprising digesting the tobacco with sulfuric acid, recovering the resulting extract, reacting lead oxide with said extract in an amount sufficient to precipitate the proteins from the extract, separating and recovering the mother liquor from the precipitate, adding an element to said liquor more electropositive than lead to precipitate any lead ions therein, and thence recovering the mother liquor from the precipitate and added element.

5. The process for obtaining a test solution from tobacco for the purpose of determining the alkaloid content thereof, comprising digesting the tobacco with sulfuric acid, recovering the resulting extract, reacting lead oxide with said extract in an amount sufficient to precipitate the proteins from the extract, separating and recovering the mother liquor from the precipitate, adding magnesium to said liquor to precipitate any lead ions therein, and thence recovering the mother liquor from the precipitate and the magnesium.

6. The process for obtaining a test solution from tobacco for the purpose of determining the alkaloid content of the tobacco, comprising digesting the tobacco with sulfuric acid, recovering the resulting extract containing alkaloids and proteins, precipitating the proteins with lead oxide, and separating and recovering the resulting alkaloid solution from the precipitate.

7. The process for obtaining a test solution from tobacco for the purpose of determining the alkaloid content of the tobacco, comprising digesting the tobacco with sulfuric acid, recovering the resulting extract containing alkaloids and proteins, reacting lead oxide with said extract in an amount sufficient to precipitate the proteins, separating and recovering the resulting alkaloid solution from the precipitate, and removing any remaining lead ions from the said alkaloid solution.

LOUIS N. MARKWOOD.